(12) United States Patent
Ringdahl et al.

(10) Patent No.: US 7,637,365 B2
(45) Date of Patent: Dec. 29, 2009

(54) CAR WASH WITH RESPONSIVE BONUS FUNCTION

(76) Inventors: Mark G. Ringdahl, P.O. Box 510, Chanhassen, MN (US) 55317; Harry Dilling, 6209 Martin Bayou, Biloxi, MS (US) 39532

( * ) Notice: Subject to any disclaimer, the term of this patent is extended or adjusted under 35 U.S.C. 154(b) by 418 days.

(21) Appl. No.: 10/865,647

(22) Filed: Jun. 10, 2004

(65) Prior Publication Data

US 2005/0000777 A1    Jan. 6, 2005

Related U.S. Application Data (60) Provisional application No. 60/478,171, filed on Jun. 16, 2003.

(51) Int. Cl.
*G07F 7/00* (2006.01)
(52) U.S. Cl. ............... 194/205; 194/215; 194/217; 705/14; 705/16
(58) Field of Classification Search ............... 194/205, 194/215; 700/275, 306
See application file for complete search history.

(56) References Cited

U.S. PATENT DOCUMENTS

| | | | |
|---|---|---|---|
| 3,765,567 A * | 10/1973 | Maiocco et al. ............... 222/30 |
| 3,815,720 A * | 6/1974 | Machanian et al. .......... 194/217 |
| 4,008,792 A | 2/1977 | Levasseur et al. ............ 194/1 N |
| 4,045,017 A * | 8/1977 | Lundblad ..................... 271/181 |
| 4,498,570 A | 2/1985 | King et al. ................... 194/1 N |
| 4,679,150 A | 7/1987 | Hayashi et al. .............. 364/479 |
| 5,371,681 A | 12/1994 | Juds et al. .................... 364/479 |
| 5,450,938 A * | 9/1995 | Rademacher ................ 194/206 |
| 5,491,326 A * | 2/1996 | Marceau et al. ............. 235/381 |
| 5,533,727 A * | 7/1996 | DeMar ......................... 463/23 |
| 6,089,284 A * | 7/2000 | Kaehler et al. ................ 141/94 |
| 6,308,885 B1 * | 10/2001 | Douglass .................... 232/57.5 |
| 6,336,636 B1 | 1/2002 | Smart .......................... 273/447 |
| 6,637,648 B1 * | 10/2003 | Gilgen et al. ................ 235/380 |
| 6,659,259 B2 * | 12/2003 | Knox et al. .................. 194/217 |
| 7,143,065 B1 * | 11/2006 | Enright ......................... 705/43 |

* cited by examiner

*Primary Examiner*—Patrick Mackey
*Assistant Examiner*—Mark Beauchaine
(74) *Attorney, Agent, or Firm*—Westman, Champlin & Kelly, P.A.

(57) ABSTRACT

A car wash includes a controller having an input element and an output element. The input element is configured to receive an input representing a payment. The output element is in operative communication with the input element, and is configured to assign an output comprising a bonus value of a product or service to be dispensed if the payment is of a preferred form.

16 Claims, 9 Drawing Sheets

CAR WASH WITH RESPONSIVE BONUS FUNCTION

The present application is based on and claims the benefit of U.S. provisional patent application Ser. No. 60/478,171, filed Jun. 16, 2003, the content of which is hereby incorporated by reference in its entirety.

FIELD OF THE INVENTION

The present invention relates to car wash devices. More particularly, the invention relates to providing bonus functions in car wash devices.

BACKGROUND OF THE INVENTION

Car wash devices are used to wash, clean and vacuum automotive vehicles and other types of vehicles. Car wash devices include both fully or partially automated devices as well as devices which provide the implements to be used by an operator in washing the vehicle. For example some types of car wash systems are large systems in which the vehicle is pulled through a series of washing stations which automatically, or manually provide various car wash functions. Another type of car wash device, the vehicle is substantially stationary while various car wash implements are moved over the surface of the vehicle. In another example car wash device, washing liquids are dispensed through a wand which is held by a user. Various implements are provided to an operator such as a brush, tire cleaner, etc., while the vehicle is parked in a bay.

To assist in providing a fully automated car wash device, some car wash devices include a money acceptor and validator unit. When a user inserts the appropriate amount of money, the acceptor/validator device provides the appropriate control signal to the car wash equipment to allow the operator to use the car wash. For example, the automated car wash sequence can be initiated once the user has provided the correct amount of funds or timers or other types of counting or limiting devices can be initiated to allow a user to dispense car washing fluids and operate car wash equipment to wash the car. For example, in a car wash bay, a timer can be started which allows the customer a limited amount of time to use the spray wand, brushes, and other equipment in the bay.

In car wash devices which are activated using money acceptors/validators, the acceptors/validators must periodically be emptied by an operator. The operator must physically open a locked portion of the acceptor/validator and remove any coins or bills which have been collected in the device. Typically, the locked box is emptied before it is completely filled. For example, if users have used small denomination bills, as opposed to large denomination bills, the lock box will fill up at a faster rate. Because the particular bills being used by customers is typically not known, the operator will typically to empty the lock box before it has actually been filled. Further, small denomination is more difficult and cumbersome for an operator to handle.

A variety of vending devices, such as car washes, for example, provide different options or variable levels of a product or service. There exists a persistent need for such a vending device to maximize the profits to be gained from its customers. There also exists a persistent need to reduce the costs of operating such a vending device. A significant source of such operating costs are due to the need for periodic visits by an operator, such as to collect money accumulated from past purchases and to replenish supplies of currency with which the vending machine is able to make change for customers.

SUMMARY OF THE INVENTION

A vending device includes an input element configured to receive an input representing a payment. An output element is in communication with the input element and is configured to assign an output related to a bonus value of a product or service to be dispensed if a preferred payment form is used.

DETAILED DESCRIPTION OF ILLUSTRATIVE EMBODIMENTS

Figure 1:
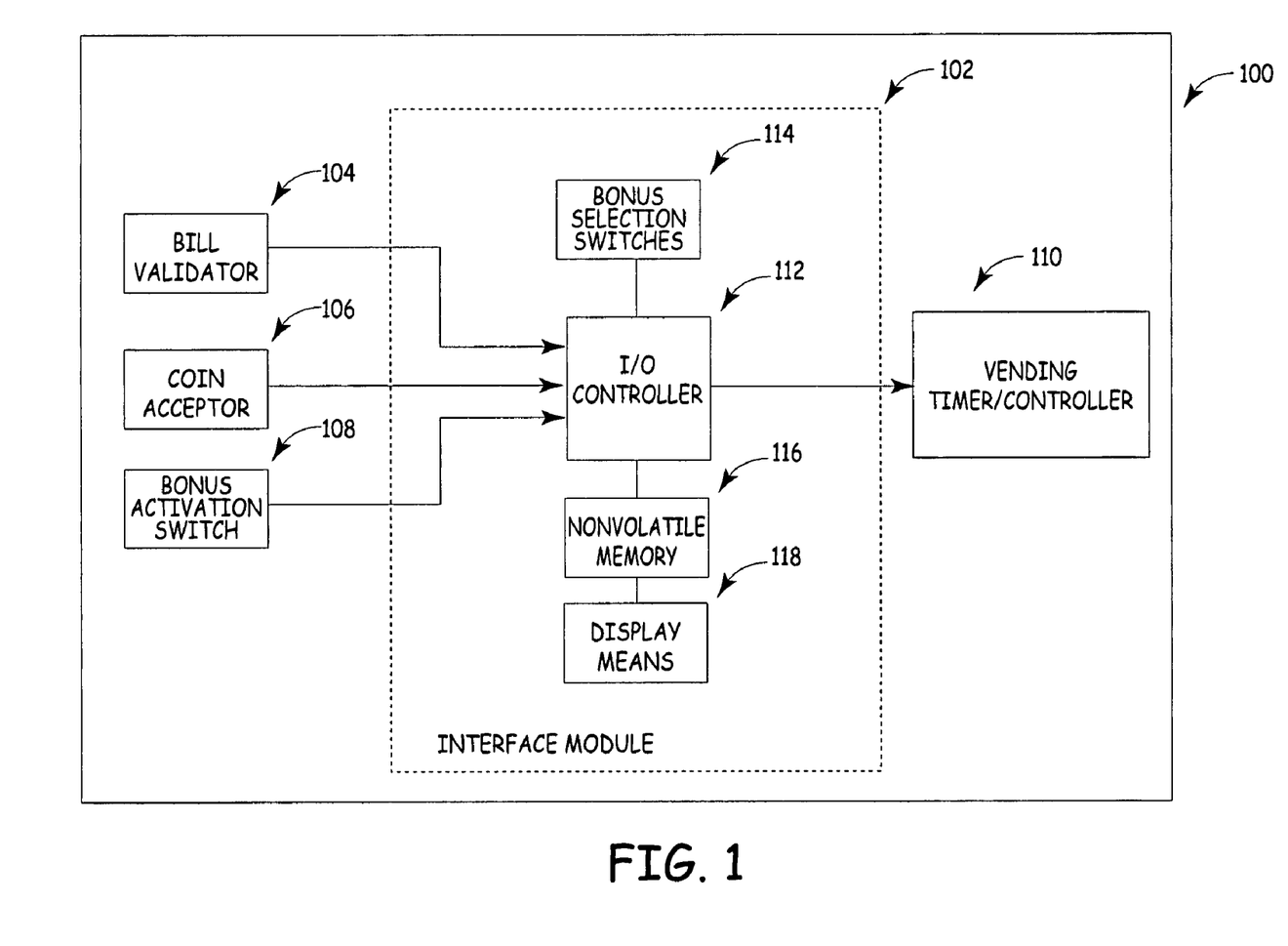
FIG. 1 depicts a block diagram of a vending device, in one embodiment.

FIG. 1 depicts vending device 100, according to one embodiment. Vending device 100 includes interface module 102, which includes input/output controller 112, in this embodiment. Vending device 100 also includes bill validator 104, coin acceptor 106, and bonus activation switch 108, which provide input to input/output controller 112 of interfacing module 102, in this embodiment. Interfacing module 102 also includes bonus selection switches 114, nonvolatile memory 116, and display means 118, in operative communication with input/output controller 112 within interfacing module 102, in this embodiment. Interfacing module 102 provides output to vending timer/controller 110, also included in vending device 100, in this embodiment.

Vending device 100 is configured for adding a bonus value to a vended product or service in relation to a preferred form of payment, such as the size of the currency denomination used in that purchase of product or service. Vending device 100 includes an input element configured to receive an input representing a payment; and an output element, in operative communication with the input element, configured to assign an output comprising a bonus value of a product or service to be dispensed if the payment is of a preferred form, in this embodiment. This input element and output element may be integral to interfacing module 102 by itself, or to input/output controller 112 by itself, or spread among several components of vending device 100 both within and outside of interfacing module 102, among other possible embodiments.

Vending device 100 accepts signals from a component that accepts a form of payment, which may include coins, tokens, paper bills, a credit card, or some other form of payment. For example, vending device 100 includes bill validator 104 for accepting paper bills, and coin acceptor 106 for accepting coins, in this embodiment.

It is often an advantage to offer an incentive to purchase additional product or service. Once a customer has made a commitment to purchase a vended product or service it is generally easier to convince that customer to make a larger product purchase or service purchase if product or service is offered at a reduced price, increased time, increased intensity, or increased volume, for example. The bonus value assigned to preferred forms of payment motivates the customers of the vending device to maximize the profitability of vending device 100, both by tending to raise revenue per purchase, and by minimizing costs of operating vending device 100, in this embodiment.

Vending device 100 motivates customers to make higher revenue purchases including by offering an incentive to use preferred forms of payment such as larger denominations of currency, which necessitates making a larger purchase. In another example, vending device 100 motivates customers to use a credit card, a form of payment which may motivate customers to spend more than if they are using cash. Since a bonus value is provided to the customers in response to their using a preferred form of payment, the customer and the operator of the vending device both gain more by the use of vending device 100, according to this embodiment.

Vending device 100 also minimizes operating costs, in various embodiments. Preferred forms of payment, for example larger currency denominations or credit card payments in some embodiments, help the operator of vending device 100 (for example, an owner or manager) by allowing quicker retrieval and accounting of the payments received, than if more coins and small bills are used. Preferred forms of payment, for example larger currency denominations or credit card payments, also aid in the accounting process or in certifying a currency count, for example.

The input element and output element may both be found in interfacing module 102, or bill validator 104, or coin acceptor 106, or vending timer/controller 110, or input/output controller 112, for example, in various embodiments conforming to FIG. 1. Alternatively, the input element may be found in bill validator 104 and/or coin acceptor 106, while the output element is found in input/output controller 112 or vending timer/controller 110; or the input element may be found in input/output controller 112 and the output element found in vending timer/controller 110, for example, in additional embodiments conforming to FIG. 1.

Other embodiments include a credit card reader, a debit card reader, or another form of electronic payment mechanism in place of or alongside bill validator 104 and coin acceptor 106, for example. The input element and/or the output element may therefore be either integrated into vending device 100 from original manufacture, or occur in a separate component, such as interfacing module 102 for example, that is fitted to vending device 100 in a later upgrade, in one embodiment.

In one embodiment, interface module 102 is configured to modify pulse signals received from bill validator 104, as one mechanism for an input representing a payment to be received and an output generated responsively thereto. Bill validator 104 is configured to receive a paper currency bill, whereby the bill is verified as legal tender, upon which a series of electrical pulses is outputted, forming a signal representing the denomination of the currency bill inserted. Coin acceptor 106 is a device in which a coin is inserted, whereby the coin is verified as legal tender, upon which a series of electrical pulses is outputted, forming a signal representing the denomination of the coin inserted. Alternatively, coin acceptor 106 may be configured to receive and validate preselected tokens, for example. Vending device 100 incorporates a non-resetable counter and display means 118 as an auditing function to verify the currency count, in this embodiment.

Interfacing module 102 is configured to receive a signal from bill validator 104 or coin acceptor 106, and retransmit the signal comprising the modified series of electrical pulse signals to vending timer/controller 110, in this embodiment.

When a larger value is communicated from bill validator 104, for example, input/output controller 112 intercepts, modifies and re-transmits that signal with an added value to vending timer/controller 110, in this embodiment. Vending timer/controller 110 accumulates the value of the received pulses and calculates the total value of the products or services to be dispensed, for example, the duration of time for a vended product or service to be dispensed, in this embodiment.

Vending timer/controller 110 is configured to receive pulses from the interconnected bill validator 104 and/or coin acceptor 106, through interface module 102, in this embodiment. In one embodiment in which vending device 100 is incorporated into a car wash, for example, the products or services to be dispensed include soap and wax that may be dispensed for variable periods of time. In this embodiment, the pulses cause vending time to accumulate in the vending timer/controller 110, so that additional pulses increase the duration of time for which the soap or wax are dispensed, for example.

Products and services available in variable quantities or of varying value may include various liquids, gases, solids, energy, and services. Typical products and services to which vending device 100 may be usefully applied may include, but are not limited to, items such as: blown air, compressed air, vacuum, water, pay shower time, soap, wax, sealant, coatings, fragrance, shampoo, chemicals, food items, beverages, ice, feed, grain, fuel, gasoline, petrol, diesel, oil, grease, lubricant, heat, cold, radiant energy, helium, oxygen, pay phone time, satellite time, cable time, Internet time, chat room time, computer time, tanning bed time, tanning oil, lotion, cosmetics, message time, hair dryer time, exercise equipment time, radio listening time, jukebox time, TV time, pay-per-view time, video game time, game time, ride time, gambling time, gambling/gaming machine credits, slot machine credits, commodities, location or event admission, toll booth passage, or other products or services, for example.

For example, in one embodiment, a one-dollar bill is deposited into bill validator 104; bill validator 104 outputs four consecutive pulses, one pulse per $0.25 worth of value; and interface module 102 accepts the four pulses, and processes the pulses in comparison to a setting on bonus selection switches 114 that does not define a one dollar bill as a preferred form of payment. Interface module 102 therefore outputs four pulses to vending timer/controller 110. In the preceding translation the one-dollar currency denomination produced the same one-dollar output.

However, a five-dollar bill ($5.00) is then deposited into bill validator 104; bill validator 104 outputs twenty consecutive pulses, one pulse per $0.25 worth of value; and interface module 102 accepts the twenty pulses, and processes the pulses against a setting on bonus selection switches 114 that does define a five dollar bill as a preferred form of payment. Based on the five-dollar currency denomination, interface module 102 therefore generates two extra pulses to add to the twenty pulses received, and transmits the twenty-two pulses to vending timer/controller 110, which responds by dispensing product or service that would otherwise have cost $5.50. This example shows that an additional 10% of the product or service associated with vending device 100 is dispensed with a five-dollar bill, as compared to a five dollar purchase made with one-dollar bills or coins, for example. The customer in this example received more value for engaging in a vending transaction using a preferred form of payment, which in this embodiment, was a five-dollar bill, i.e. a larger currency denomination.

Interface module 102 shown in FIG. 1 comprises an input/output controller 112 containing a mechanism or algorithm used to modify the pulse signals received from the bill validator 104 and/or coin acceptor 106, according to commonly known mechanisms such as digital logic or software, in this embodiment. The modified pulse signal is dependent on the following criteria in this embodiment. The first criterion is the number of consecutive pulses received from bill validator 104 and/or coin acceptor 106. For example, one electrical pulse is equated to 25¢ worth of value for the vended product or service, in this embodiment. Therefore, four consecutive pulses equate to one dollar worth of value, twenty consecutive pulses equate to five dollars worth of value, forty consecutive pulses equate to a ten dollar bill, eighty consecutive pulses equate to a twenty dollar bill, and so on. (Inserting several bills one after another would be distinguished from a single bill by not generating their pulses consecutively, in this embodiment.)

Second, bonus selection switches 114 determine the amount of additional value that is added to the vending transaction, as functions of preferred forms of payment, in this embodiment. Bonus selection switches 114 may be set to a variety of different settings, to provide various levels of bonus values for given preferred forms of payment, in various embodiments. Table A and B, infra, show the switch selections required to add increments of 25¢ worth of value to a vending transaction, in two embodiments.

TABLE A

Selecting Bonus Amounts when a $1 Bill is used, in one embodiment. Switch #1, #2 & #3 add bonuses of 25¢, 50¢, and $1.00 respectively, allowing $2^3 = 8$ combinations, in this embodiment.

| Switch Selection | | | Bonus | Total |
|---|---|---|---|---|
| #1 | #2 | #3 | Amount | Amount |
| Off | Off | Off | None | $1.00 |
| On | Off | Off | 25¢ | $1.25 |
| Off | On | Off | 50¢ | $1.50 |
| On | On | Off | 75¢ | $1.75 |
| Off | Off | On | $1.00 | $2.00 |
| On | Off | On | $1.25 | $2.25 |
| Off | On | On | $1.50 | $2.50 |
| On | On | On | $1.75 | $2.75 |

TABLE B

Selecting Bonus Amounts when a $5 Bill is used, in one embodiment. Switch #4, #5 & #6 add bonuses of 25¢, 50¢, and $1.00 respectively, allowing $2^3 = 8$ combinations, in this embodiment. Many other numbers of combinations occur with additional bonus switches, offering many bonus options for the vending device owner or operator to choose from; while additional cells of switches may be applied to additional preferred forms of payment, such as ten or twenty dollar bills, credit card payments, electronic fund transfers, debits against prepaid accounts, etc.

| Switch Selection | | | Bonus | Total |
|---|---|---|---|---|
| #4 | #5 | #6 | Amount | Amount |
| Off | Off | Off | None | $5.00 |
| On | Off | Off | 25¢ | $5.25 |
| Off | On | Off | 50¢ | $5.50 |
| On | On | Off | 75¢ | $5.75 |
| Off | Off | On | $1.00 | $6.00 |
| On | Off | On | $1.25 | $6.25 |
| Off | On | On | $1.50 | $6.50 |
| On | On | On | $1.75 | $6.75 |

When a consecutive series of electrical pulses is received by the input element, whether in bill validator 104, interface module 102, input/output controller 112, or vending timer/controller 110, for example, equating to one dollar or four pulses, the criteria in Table A are used to determine the additional bonus value to be added to the retransmitted electrical pulses sent to the output element, such as in vending timer/controller 110, in this embodiment. Similarly, when a consecutive series of twenty electrical pulses is received by the input element, for example in bill validator 104 or interface module 102 in different embodiments, equating to five dollars or twenty pulses, the criteria in Table B are used to determine the additional value to be added to the retransmitted electrical pulses sent to the output element, for example in vending timer/controller 110, in this embodiment. In an alternative embodiment, a single bonus selection switch performs the entire bonus selection function performed by bonus selection switches 114 in the description above.

Bonus selection switches 114 may also include additional settings besides those to set the bonus value relationships, in alternative embodiments. For example, in one embodiment, bonus selection switches 114 also include means to select a recurring period of time during which bonus values are available, and another recurring period of time during which bonus values are not available and the goods or services are dispensed at the regular retail rate, without regard to preferred forms of payment. Or, these settings may allow the bonus value to vary otherwise from one recurring period of time to another. This would allow the bonus value to be available or to increase depending not only on a preferred form of payment, but also on a preferred recurring period of time for the transaction.

The recurring periods of time over which the available bonuses vary may include time of day, day of the week, or time of year, among other possibilities, in different embodiments. This represents an additional advantageous feature of various embodiments, by allowing the owner or operator of the car wash or other vending device to offer special incentives for customers to perform transactions at off-peak times, for example. For example, the bonus features may offer the option to be made available in morning or late evening, while being unavailable during the afternoon and early evening. As another example, the bonus features may offer the option to be made available on Monday through Wednesday, but not on Thursday through Sunday. As yet another example, the bonus features may offer the option to be made available during the early spring and late autumn, but not during summer, for example. These options for availability as a function of recurring periods of time, on a variety of scales, may be used with a variety of options for preferred forms of payment, in different embodiments.

In addition, FIG. 1 shows nonvolatile memory 116 used to accumulate the count of currency accepted by bill validator 104 and/or coin acceptor 106 determined by input/output controller 112. Display means 118 is used to view accumulated currency stored in nonvolatile memory 116.

Figure 2:
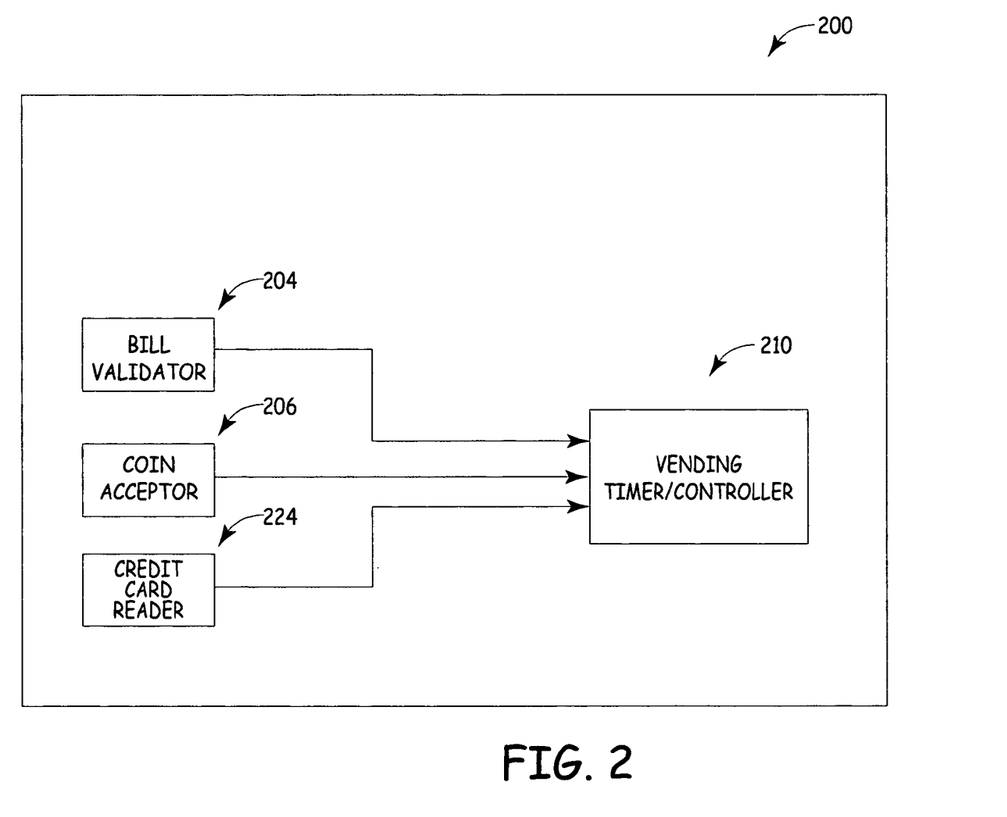
FIG. 2 depicts a block diagram of a vending device, in one embodiment.

FIG. 2 depicts a block diagram of a vending device 200, in one embodiment. Vending device 200 includes bill validator 204, coin acceptor 206, credit card reader 224, and vending timer/controller 210. Vending device 200 includes an input element configured to receive an input representing a payment. This input element may be comprised in vending timer/controller 210, and/or in bill validator 204, coin acceptor 206, and credit card reader 224. Vending device 200 also includes an output element, comprised in vending timer/controller 210 in this embodiment, in operative communication with the input element, configured to assign an output comprising a bonus value of a product or service to be dispensed if the payment is of a preferred form. Vending device 200 begins to demonstrate some of the additional variety of contemplated embodiments.

Figure 3:
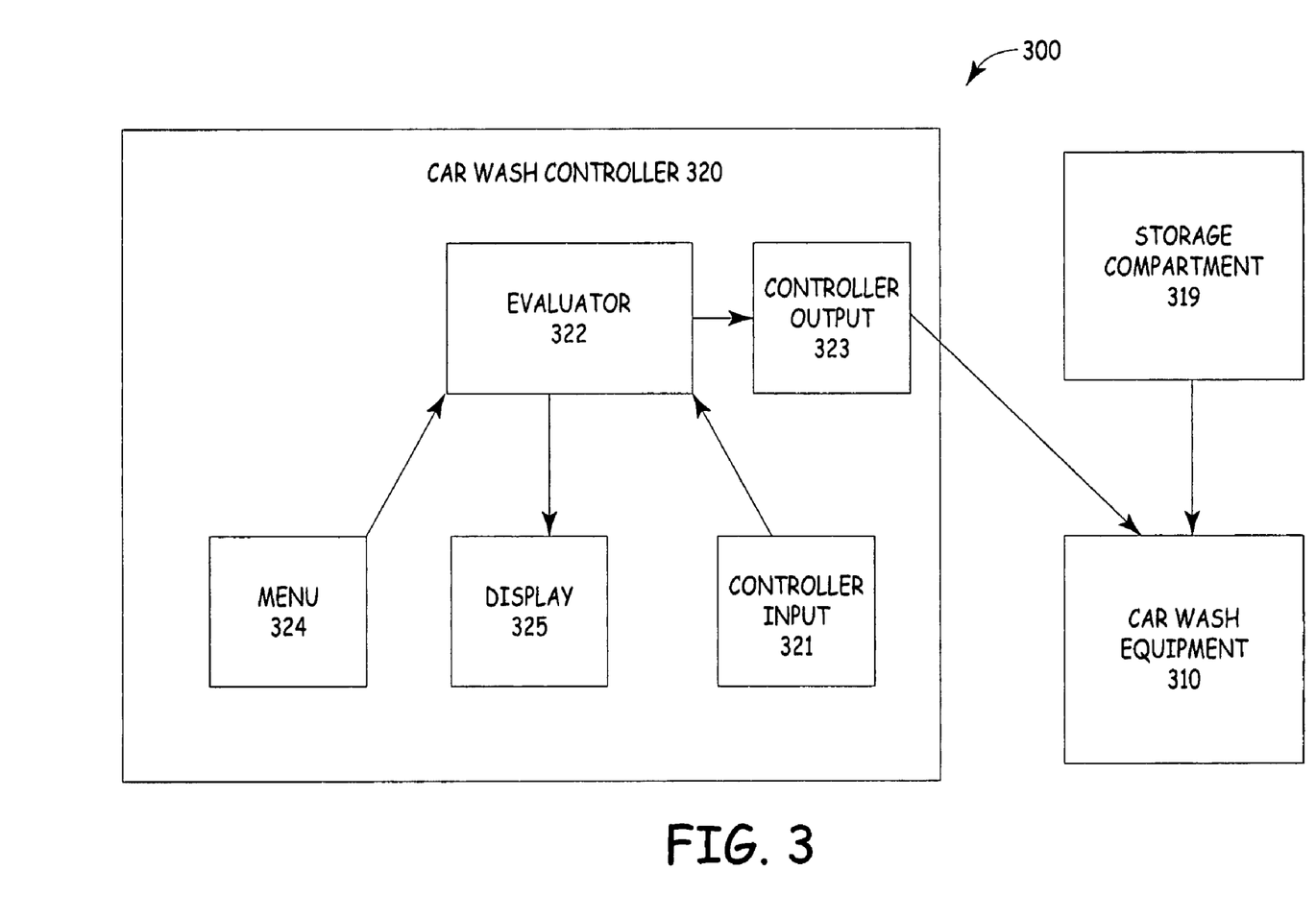
FIG. 3 depicts a block diagram of a car wash, in one embodiment.

FIG. 3 depicts a block diagram of a car wash, as one embodiment of a vending device. Car wash 300 includes car wash controller 320, car wash equipment 310 and storage compartment 319, in this embodiment. Car wash controller 320 and storage compartment 319 are both operatively connected to car wash equipment 310. Car wash controller 320 includes controller input 321, evaluator 322, controller output 323, menu 324 and display 325. An input element is comprised in car wash controller 320, such as in controller input 321 or evaluator 322, for example. An output element is also comprised in car wash controller 320, such as in evaluator 322 or controller output 323, for example.

Controller input 321 is in operative communication with evaluator 322, to convey the required information regarding fund inputs received at controller input 321, in one embodiment. Controller output 323 is operatively connected to evaluator 322 to receive the required information from evaluator 322 in this embodiment, in response to which controller output 323 provides a car wash control signal from car wash control 320 to car wash equipment 310. Menu 324 is also in operative communication with evaluator 322 in this embodiment, whereby options in car wash functions entered by a user at menu 324 are communicated by evaluator 322 and included in information provided therefrom to controller output 323 to be included in the car wash control signal. Display 325, in this embodiment, is also in operative communication with evaluator 322, whereby it may receive relevant information from evaluator 322, such as a running tally of the accumulation of credit values, including bonus credit values, or other relevant information. Car wash 300 demonstrates additionally some of the variety possible in various alternative embodiments.

Figure 4:
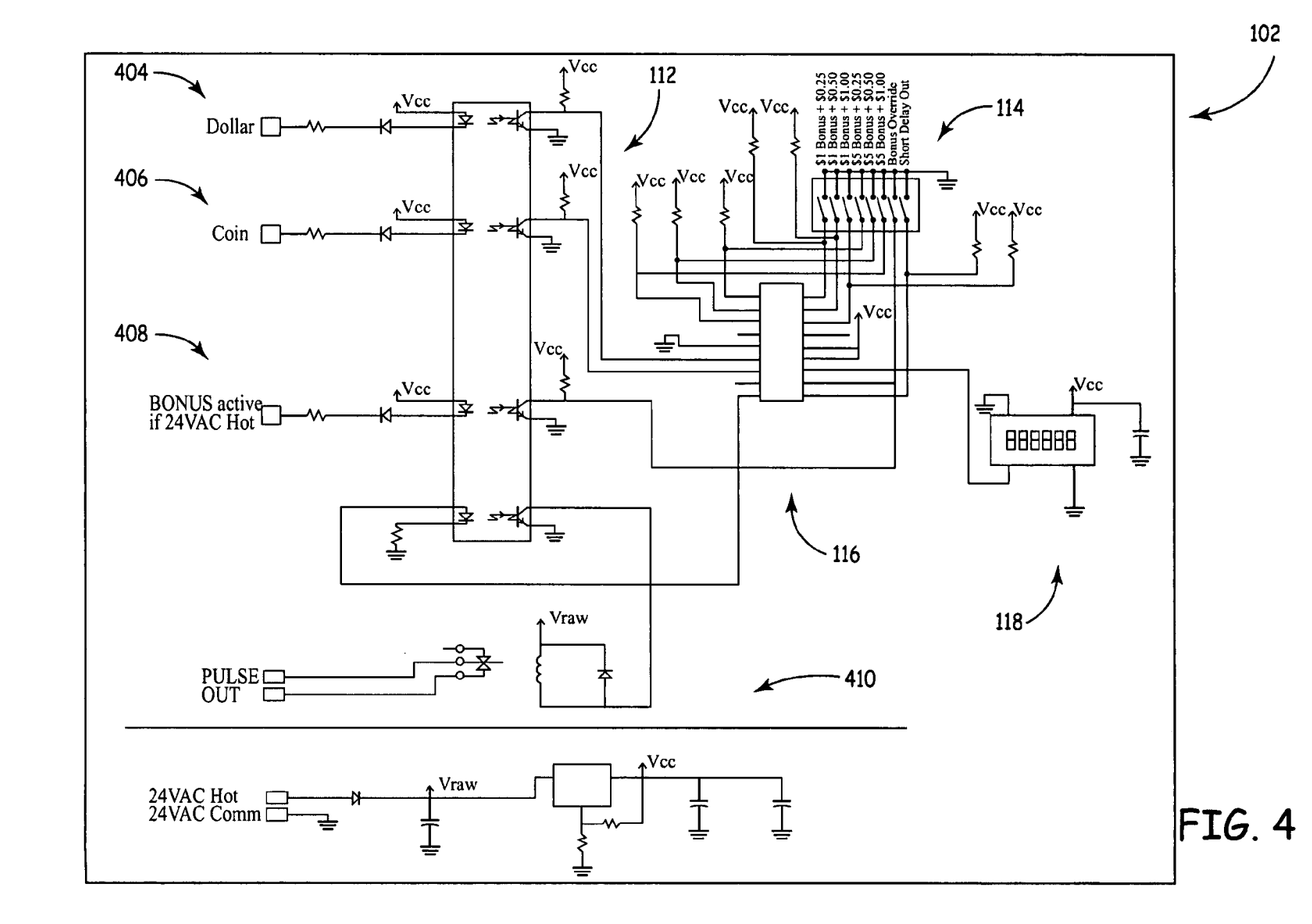
FIG. 4 depicts a circuit schematic of a vending device, in one embodiment.

FIG. 4 depicts a detailed schematic diagram of interface module 102 shown in FIG. 1 as a component of vending device 100. Referring in part to components depicted in FIG. 1, interface module 102 includes bill validator input 404 for bill validator 104, coin acceptor input 406 for coin acceptor 106, bonus activation switch input 408 for bonus activation switch 108, vending timer/controller output 410 from vending timer/controller 110, input/output controller 112, bonus selection switches 114, nonvolatile memory 116, and display means 118, in this embodiment, as described above for FIG. 1. FIG. 4 demonstrates additionally the mechanisms for the operation of interface module 102, according to one embodiment.

Figure 5:
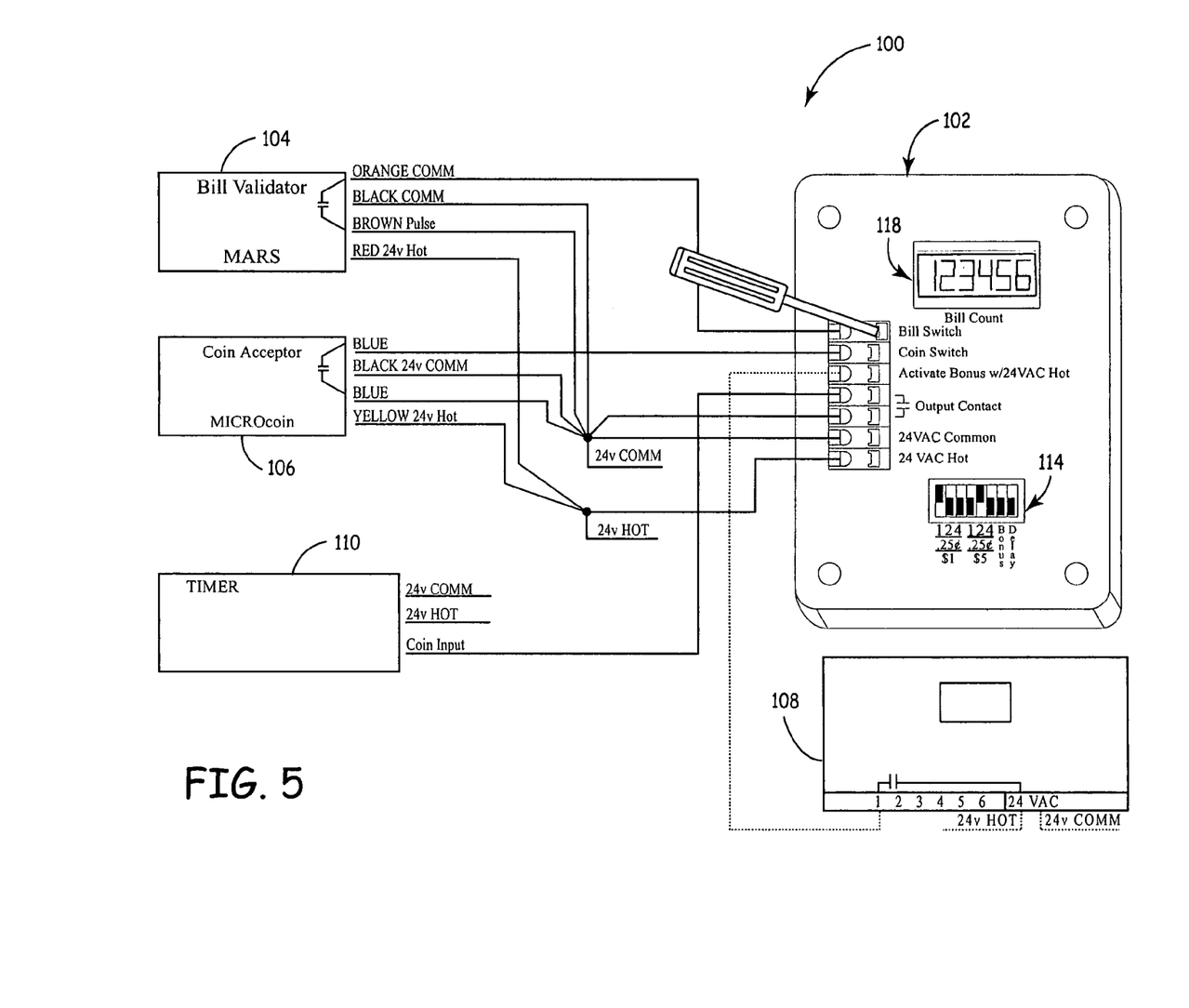
FIG. 5 depicts a vending device, in one embodiment.

FIG. 5 depicts a partial schematic diagram with a partial visual representation of vending device 100, according to one embodiment consistent with FIG. 1. Vending device 100 includes bill validator 104, coin acceptor 106, bonus activation switch 108, vending timer/controller 110, and interfacing module 102, which includes input/output controller 112, bonus selection switches 114, nonvolatile memory 116, and display means 118, in this embodiment, as described above for FIG. 1. FIG. 5 further demonstrates the mechanisms by which vending device 100 operates, according to one embodiment.

Figure 6:
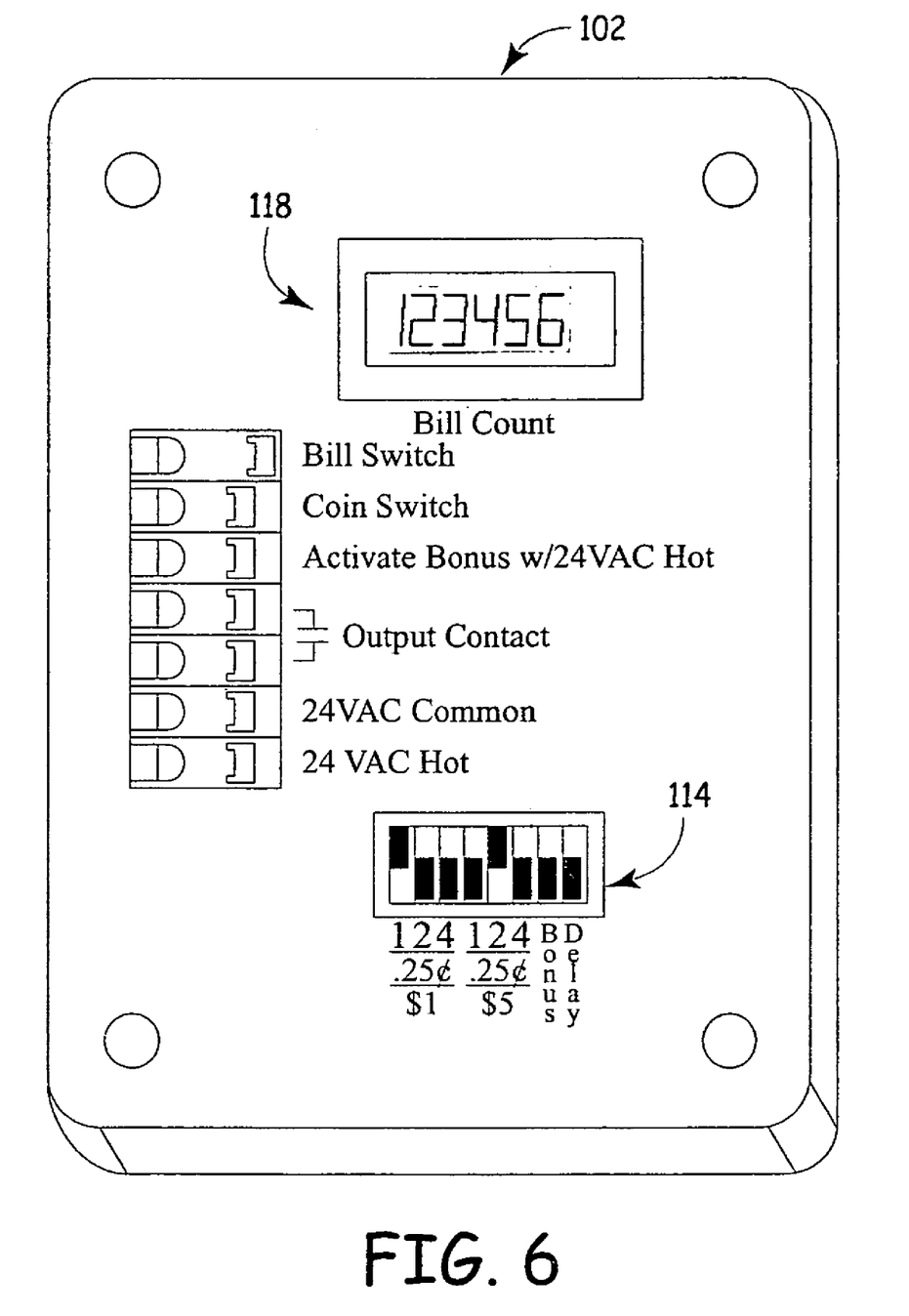
FIG. 6 depicts a vending device, in one embodiment.

FIG. 6 depicts a visual representation of interfacing module 102, according to the embodiment of FIG. 5. Interfacing module 102 includes input/output controller 112, bonus selection switches 114, nonvolatile memory 116, and display means 118, in this embodiment, as described above for FIG. 1. FIG. 6 provides a closer look at the configuration of vending device 100 according to one embodiment.

Figure 7:
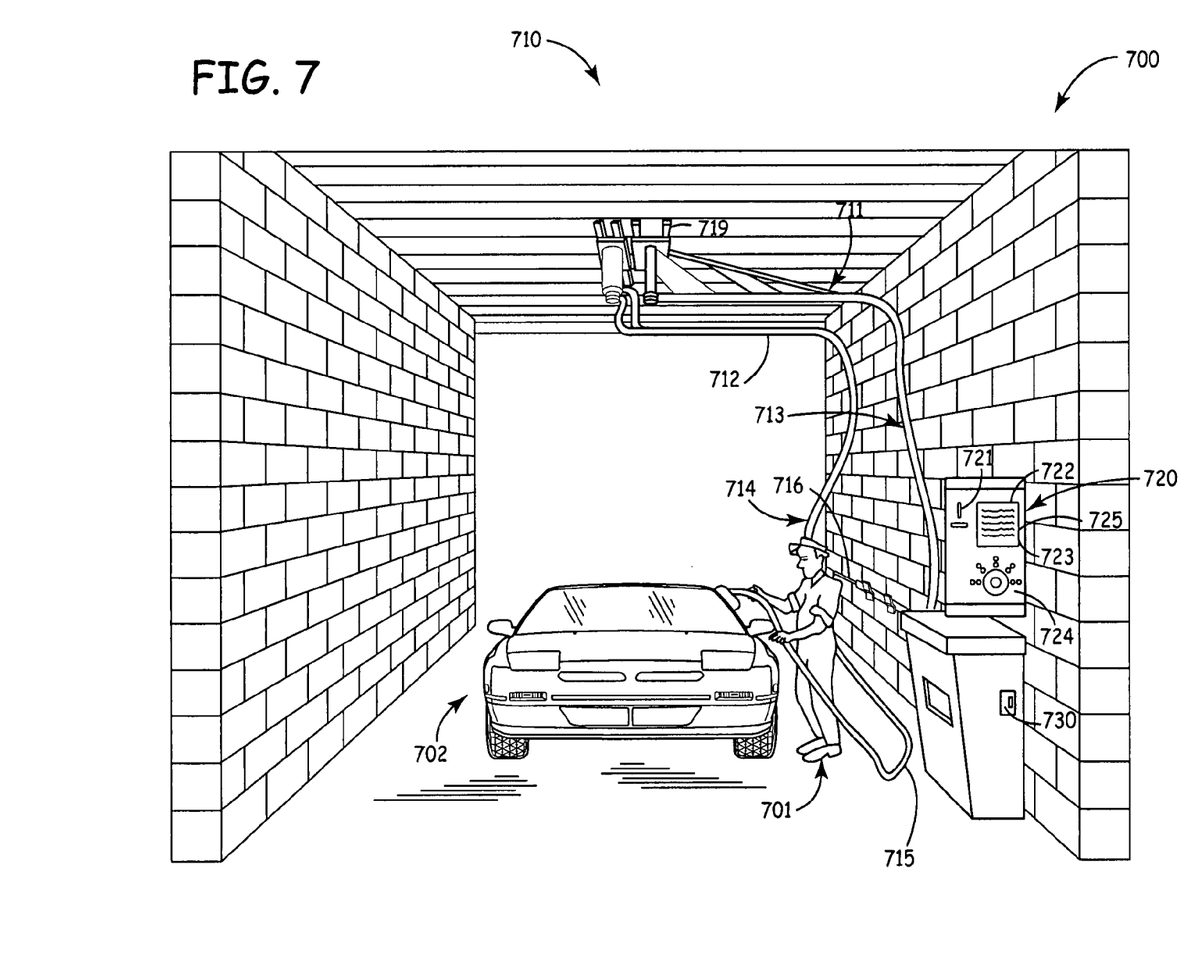
FIG. 7 depicts a car wash, in one embodiment.

FIG. 7 depicts car wash 700, as an example of a system incorporating a vending device according to one embodiment. Car wash 700 includes car wash equipment 710 and car wash controller 720 in operative communication with car wash equipment 710. Car wash equipment 710 includes booms 711 and 712, hoses 713 and 714, scrub brush 715, spray gun 716, and storage compartment 719. The user 701 is depicted using the car wash equipment 710, particularly the scrub brush 715, to clean his car 702. Car wash controller 720 includes controller input 721, evaluator 722, controller output 723, menu 724, and display 725. Menu 724 indicates several car wash functions from which a user may choose. These include, for example, prerinse, pressure wash, scrub brush wash, rinse, and wax. Display 725 includes information about the cost of these functions along with information on bonus value credits corresponding to use of preferred forms of payment, such as larger units of currency in this embodiment.

Controller input 721 includes a coin acceptor and a bill validator for receiving either coins or bills, respectively. For example, controller input 721 may be configured to receive nickels, dimes, quarters, one dollar bills, five dollar bills, ten dollar bills and twenty dollar bills.

Evaluator 722 sits inside of car wash controller 720. Evaluator 722 is configured to assign a credit value to each unit of currency, or fund input, according to a preselected scheme, such as would be selected using bonus selection switches as in the previous figures. In particular, evaluator 722 assigns a bonus credit value to a fund input that is among the preferred forms of payment, while evaluator 722 assigns a nominal credit value to a disfavored fund input, i.e. that is not preselected as a preferred form of payment, such as a quarter in this embodiment, for instance.

The ratio of the bonus credit value to the monetary credit value of the preferred fund input is greater than the ratio of the nominal credit value to the monetary value of the disfavored fund input, in this embodiment. For example, a 1:1 relationship may be used to assign a credit value to the monetary value for a disfavored fund input, while a 1.2:1 relationship, for example, may serve to assign the bonus credit value relative to the monetary value of a preferred form of payment, in this embodiment.

For example, a quarter may be a disfavored fund input in one embodiment, while a five dollar bill is a preferred fund input in this embodiment. If a quarter is received at the controller input, the evaluator will assign a credit value based on a 1:1 relationship to the monetary value of that quarter; in other words, the evaluator 722 will assign a credit value of 25 cents based on the 25 cent monetary value of the quarter, in this embodiment. On the other hand, the evaluator 722 would assign a credit value of six dollars, for example, based on receiving a five dollar bill at the controller input. (This would correspond, for example, to the bonus selection switches for the five dollar bill being set to 4:off, 5:off, 6:on, in the scheme of Table 2, supra.) The six dollar credit value is the result of figuring a credit value in a 1.2:1 relationship with the five dollar monetary value of the five dollar bill, in this embodiment.

For example, if a user were to enter twenty quarters at controller input 721, adding a total of five dollars in monetary value to car wash controller 720, the accumulated credit value assigned would still only be five dollars; while that user could instead enter a five dollar bill at controller input 720, and be rewarded with a assigned credit value of six dollars, after the output element comprised within car wash controller 720 assigns the corresponding bonus value, in this embodiment. The user therefore has a substantial incentive to input preferred forms of payment, such as five dollars bills in this embodiment, in order to pay for the car wash functions.

After that, the user may select a car wash function having a price that is not greater than the accumulated credit values up to that point. Controller output 723 of car wash controller 720 then provides a car wash control signal from car wash controller 720 to car wash equipment 710, providing for car wash equipment 710 to perform the specified car wash function.

In various other embodiments, the preferred form of payment may include one dollar bills, five dollars bills, ten dollar bills, twenty dollar bills, or quarters or other coins, or other forms of U.S. currency. In other embodiments, the preferred fund input may be a non U.S. currency, such as units of currency measured in euros, Canadian dollars, Mexican pesos, British pounds, Japanese yen, Chinese yuan, Swiss francs, Australian dollars, Indian rupees, Brazilian reals, or other currencies, for example. In yet other embodiments the preferred form of payment may include tokens or other currency substitutes. In still other embodiments, the preferred fund input may include an electronic form of payment such as a credit card, a debit card, or an electronic fund transfer, such as via a cell phone, or a debit against a prepaid account, such as with the operator of the vending device, in various embodiments. In yet other embodiments, the preferred form of payment may include a temporary payment card enabled to store and remit funds, such as via a magnetic strip; such a temporary payment card may take the form of a gift certificate card, a coupon card, or a one-time usage card. In still another embodiment, the preferred form of payment may include a code or key provided to a customer in an earlier transaction, enabling the customer to pay in advance, then to input the code, such as at a numbered keypad, or to engage the key, to render payment.

In an alternative embodiment, evaluator 722 may also assign a bonus credit value to any currency that is received after a preselected threshold of credit value is crossed, such as which qualifies as a bulk transaction or a customer reward or "frequent flyer/frequent user" incentive program. This may be counted in only a single transaction session, or tracked across multiple transaction sessions over extended durations of time, in different embodiments. As one example, a bulk transaction threshold may be ten dollars, in one embodiment. In this case, the evaluator 722 would also assign a bonus credit value to any fund input received that adds to the accumulated credit value above an accumulated credit value of ten dollars. This promotes further advantages: for example, to encourage users to enjoy and pay for additional car wash functions, or for example, to motivate users to bring a friend, thereby increasing the transaction volume and market penetration by car wash 700. Embodiments similar to these may also occur in other vending device embodiments outside of the specific example of a car wash.

Menu 724 and display 725 can take a variety of different forms in different embodiments. For example, in one embodiment, display 725 may include a responsive delay which communicates to the user options for different car wash functions, as well as options for additional fund units required to pay for different car wash function options, in this embodiment. This may include suggestions for depositing preferred fund units in order to receive a bonus credit value, in this embodiment.

Car wash controller 720 also includes security device 730 in this example, which takes the form of a locked panel in this example. Security device 730 renders a management compartment (not separately depicted in FIG. 7) of car wash controller 720 inaccessible to anyone without the means to clear security device 730, such as a key. The management compartment includes access to the stored currency and bonus selection switches, for example. Other forms of security device occurring in other embodiments include, for example, combination locks or other security devices familiar in the art.

In one embodiment, car wash controller 700 also includes a validator (not separately depicted in FIG. 7), which is operably connected to evaluator 722, for confirming that the fund inputs are valid. This may include a typical security device for distinguishing genuine from counterfeit units of currency, for example, as in any of several common forms typically used in vending machines and other currency receiving devices.

Figure 8:
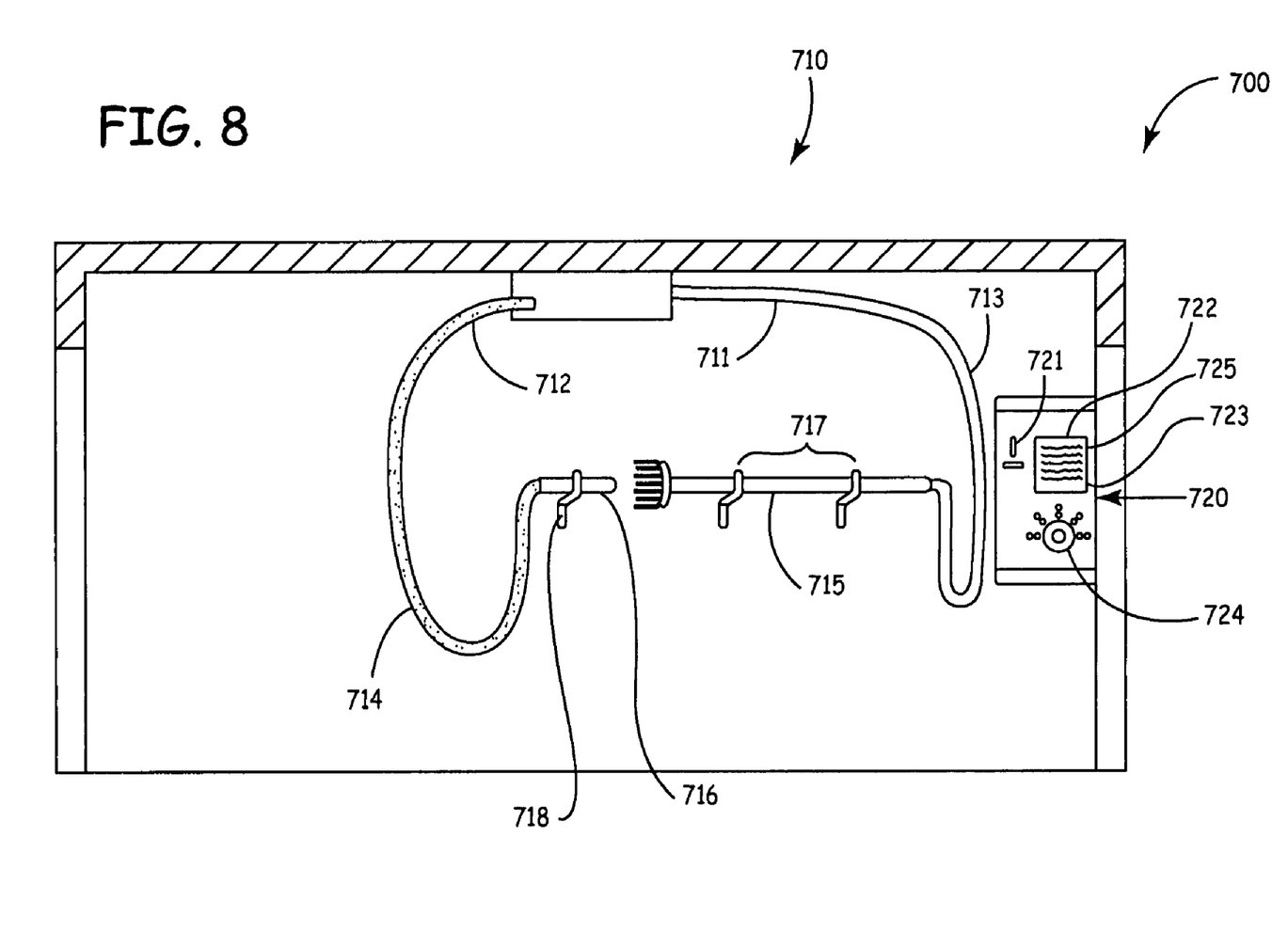
FIG. 8 depicts a car wash, in one embodiment.

FIG. 8 provides a side view of car wash 700, which includes car wash equipment 710 and car wash controller 720. Many features appear in FIG. 8 in common with their appearance in FIG. 7, including booms 711 and 712, hoses 713 and 714, scrub brush 715, spray gun 716, controller input 721, evaluator 722, controller operator 723, menu 724, and display 725. FIG. 8 also depicts equipment racks 717 and 718, for holding scrub brush 715 and spray gun 716 when not in use. FIG. 8 further depicts car wash controller 720 including an input element and an output element configured to assign an output comprising a bonus value, within the context of car wash 700 in one illustrative embodiment.

Figure 9:
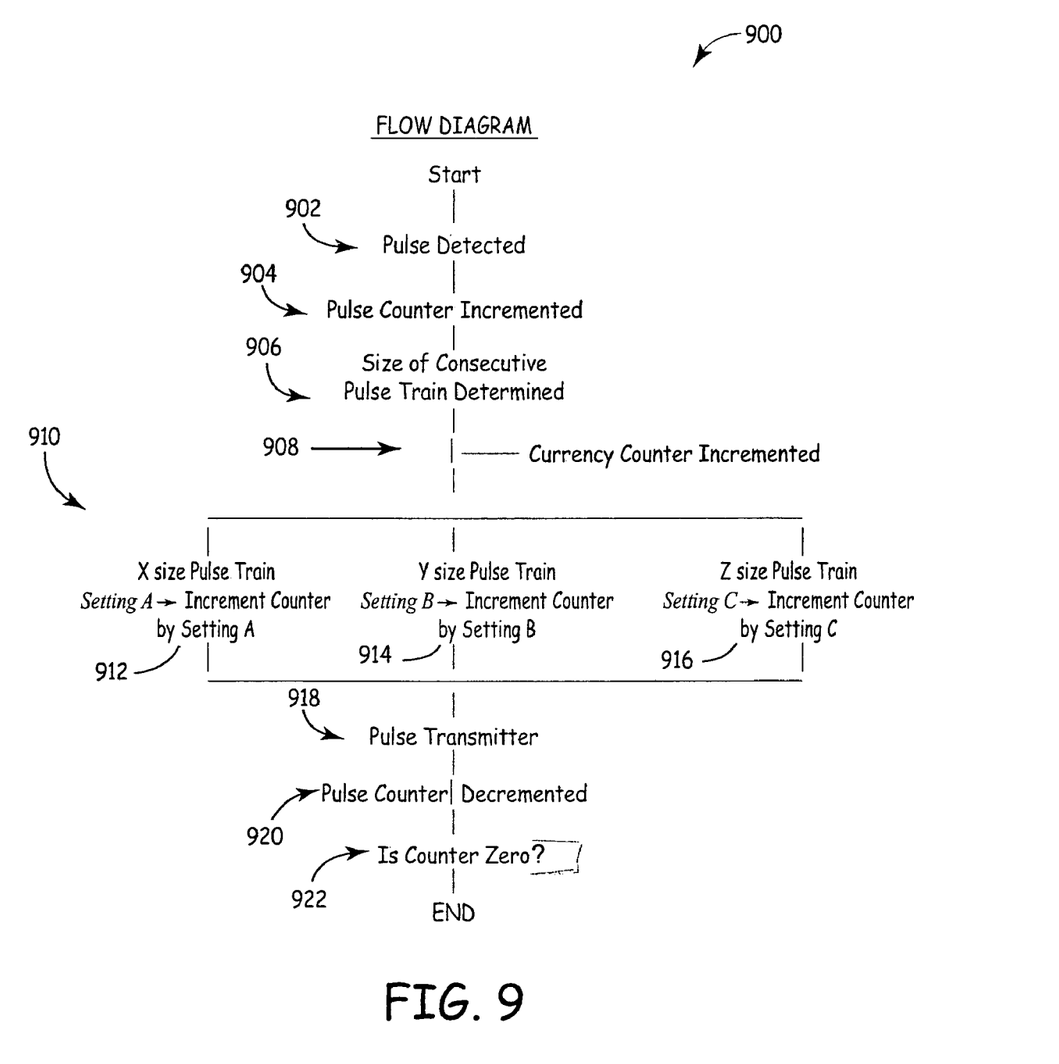
FIG. 9 depicts a flow chart illustrating the operation of a vending device, in one embodiment.

FIG. 9 includes a flow chart depicting process 900 illustrating the operation of a vending device, in one embodiment. From the start, step 902 includes detection of a pulse, such as by an input element. Step 904 includes incrementing a pulse counter responsively to the pulse, i.e. adding 1 to the value on the counter, from an initial value of 0, for each consecutive pulse in a pulse train. Step 906 includes determining the size, or number of pulses, of a pulse train, once the consecutive pulses have run their course. Step 908 includes the currency counter being incremented according to the number of the pulse train, i.e. tagging the correct denomination of currency based on the number of pulses. If each pulse represents 25 cents for example, then the minimum size of currency acceptable is a quarter, and the denomination is equal to 25 cents per pulse, e.g. a one dollar bill for four pulses, etc., in this embodiment.

From there, step 910 includes different options depending on which denomination was tagged. For example, the X size pulse train may represent a train of twenty consecutive pulses where each pulse represents five cents, as in an embodiment that accepts nickels as its minimum value currency. The currency counter is then tagged to a one dollar bill, triggering the step 912 option of general step 910, in this embodiment. Setting A will have been preselected among several bonus selection switch options, in this embodiment; or only one preset bonus level for this denomination may be built in, in an alternative embodiment. In the embodiment at hand, a 1.1:1 ratio was preset with the bonus selection switches, making a one dollar bill a preferred form of payment yielding a ten cent bonus value per one dollar bill. Therefore, the output element assigns an output of twenty-two pulses in this example of step 912, since each pulse represents five cents in this embodiment, thereby comprising a bonus value of ten cents worth of bonus credit toward the product or service to be dispensed.

Similarly, step 910 also includes the optional steps 914 and 916, triggered by a Y or Z size pulse train, respectively. For example, a Y size pulse train may be 100 consecutive nickel-worth pulses to represent a five dollar bill, while a Z size pulse train may be 400 consecutive nickel-worth pulses to represent a twenty dollar bill, for example. In an embodiment for step 914 conforming to the bonus selection switch scheme of table 2, supra, with the bonus switches set to #4:off, #5:on, #6:on, for example, the bonus value awarded would then be a generous $1.50 per five dollar bill, making 30% extra, for a total value yielded of 130 pulses on the output, or $6.50 worth of product or service dispensed per five dollar bill received. Step 916 meanwhile may be set to a setting C of a 40% premium, so that the twenty dollar bill and its 400 pulse input train is assigned by the output element for an output of 560 pulses, including a bonus value of eight dollars, for a total of $28 of goods or services dispensed.

Step 918 includes the actual transmission of the output comprising the bonus value, as determined in step 910. Step 920 includes the pulse counter being decremented back to zero, at which point it is stopped by step 922, and stands ready to repeat the entire process 900 when the next train of consecutive pulses is instigated by another payment.

In an alternative embodiment, a simple preset bonus ratio, such as 10%, may be awarded to any credit card transaction, regardless of the dollar amount used. This represents the possibility for the credit card payment, rather than the tender of a specific denomination of currency bill, to be preselected as a preferred form of payment, in one embodiment. Therefore, a vending device transaction may take place for the purchase of a "works" car wash for a listed price of eleven dollars, for example, with payment made by credit card, and the actual price charged discounted to ten dollars, with a ten percent bonus value awarded due to the use of a preselected preferred payment form. Or in an alternative embodiment, for example, the car wash functions cost the same amount, e.g. eleven dollars in this example, but last for e.g. ten percent longer, dispensing 10% more soap, wax, etc. during the various steps. This is another example of how the customer may be rewarded significantly for using a preferred payment form according to an alternative embodiment.

The aims of the present invention include increasing revenue and reducing costs associated with a vending device, and otherwise solving the problems stated above. This includes motivating customers to make larger purchases, and to use preferred forms of payment, by dispensing bonus values of goods or services in response to preferred forms of payment.

For example, a car wash, as one embodiment of a vending device, may provide a bonus value when a five dollar bill is received at the input rather than quarters or one dollar bills. This will provide that the input of the car wash receives far fewer units of currency, thereby greatly reducing the frequency with which a operator must collect the currency, in this embodiment. This also provides the advantage of encouraging the users to use larger currencies, and to select more expensive car wash functions, or a greater number of car wash functions. This is an obvious advantage to the operator of the car wash. It is also of advantage to the user, who receives a greater value for her money.

One objective of the present invention is to provide a means of simplifying the retrieval of coin, currency and other payments forms from the vending device. Increasing the ratio of large currency denomination to small currency denomination and coin, or encouraging electronic payments such as with a credit card, simplifies the accounting task of counting and sorting payments.

Furthermore, simplifying the retrieval of payments by concentrating the payments into larger denominations, for example, allows the operator of a vending device to extract the accumulated currency and coin more quickly. Quickly extracting a less cumbersome bundle of currency and coin can also add to a more secure retrieval. Offering a bonus value for preferred payments forms such as larger denominations of currency or electronic payments may also encourage customers to make larger overall transactions.

Accordingly, one embodiment of the present invention pertains to a vending device that includes an input element and an output element. The input element is configured to receive an input representing a payment. The output element is in operative communication with the input element, and is configured to assign an output comprising a bonus value of a product or service to be dispensed if the payment is of a preferred form.

Another embodiment of the present invention pertains to a car wash that includes car wash equipment and a car wash controller. The car wash equipment is configured to perform a car wash function from among at least two car wash functions in response to a car wash control signal. The car wash controller is in operative communication with the car wash equipment, and includes a controller input, an evaluator, and a controller output. The controller input is configured to receive a plurality of fund inputs, each representative of a respective monetary value. The evaluator is configured to assign a plurality of credit values respectively to each of the fund inputs, wherein a bonus credit value is assigned to a fund input of a preferred form. The controller output is configured to provide the car wash control signal from the car wash controller to the car wash equipment based upon an accumulation of the credit values.

Another embodiment of the present invention pertains to a vending device that includes a means for receiving an input representing a payment, and a means for assigning an output comprising a bonus value of a product or service to be dispensed if the payment is of a preferred form.

Additional objects, features, and advantages of the present invention may be discerned through the corresponding description and figures, and inferred by those in the art from the general teaching of the present disclosure and in the course of practicing, manufacturing, using, and otherwise experiencing different embodiments, as defined by the appended claims.

In various aspects, the present invention provides car wash controller having a controller output configured to receive a plurality of fund inputs each representative of a respective monetary value, an evaluator configured to assign a plurality of credit values to each of the fund inputs, wherein a bonus credit value is assigned to a fund input of a preferred form, and the evaluator responsively provide an accumulated credit value output, and a controller output configured to provide a car wash control signal to car wash equipment based upon the accumulated credit value output. In another example, the evaluator is configured to assign respective credit values to each of the monetary inputs and a relationship between a first monetary value and a first credit value is different than a second relationship between a second monetary value and a second credit value. A method includes receiving monetary funds, identified the preferred monetary fund type and vending a higher value product or service based upon identification of a preferred monetary fund type. In another example, a controller is configured to provide a control signal based upon a form or type of a monetary fund received by a monetary fund receiver. In another example, a controller tallies a bonus value if a form of a payment is a preferred form of payment.

Although the present invention has been described with reference to illustrative embodiments, workers skilled in the art will recognize that changes may be made in form and detail without departing from the spirit and scope of the invention.

What is claimed is:

1. A car wash comprising:

a car wash bay comprising sufficient space for a car and for a user to wash the car;

car wash equipment disposed in the car wash bay and configured to perform a plurality of car wash functions in response to a car wash control signal, and for a duration of time determined by a number of electrical pulses in the car wash control signal, with different durations of time per electrical pulse for different car wash functions;

a payment validator disposed in the car wash bay, the payment validator being configured to accept forms of payment comprising coins, bills, and magnetic cards, to verify accepted payments, and to provide original payment signals, each comprising a series of electrical pulses representing a verified payment of a certain amount, with a number of electrical pulses proportional to the amount of the payment; and a car wash controller disposed in the car wash bay and in operative communication with the payment validator and the car wash equipment, the car wash controller comprising:

a controller input configured to receive a plurality of fund inputs, as represented in the original payment signals, each representative of a respective monetary value;

an evaluator configured to assign a plurality of credit values respectively to each of the fund inputs, wherein a bonus credit value is assigned to a fund input of a preferred form, and to responsively provide an accumulated credit value output, in which assigning the plurality of credit values comprises comparing the original payment signals with a set of bonus selection switch settings, and providing modified car wash control signals that comprise additional electrical pulses representing bonus credit values indicated by the bonus selection switch settings, if a bonus credit value for the original payment signal, the form of payment, and the recurring period of time is indicated by the bonus selection switch settings;

a controller output configured to provide the modified car wash control signals from the car wash controller to the car wash equipment based upon the accumulated credit values output such that car wash functions are provided for periods of time proportional to the number of electrical pulses in the modified car wash control signals, such that additional pulses increase the duration of time for which the car wash functions are provided; and one or more bonus selection switches, operatively connected to the evaluator and secured with a security device that allows a car wash manager to access the bonus selection switches while rendering the bonus selection switches inaccessible to general users of the car wash, in which the bonus selection switches are selectably configurable to provide the bonus selection switch settings, which provide for a selectable number of additional pulses to add to the car wash control signal based on bonus criteria that comprise the amount of the payment, the form of payment, and the recurring period of time, such that the bonus credit value assigned to the fund input of the preferred form is configured to be selectable from at least two options on the bonus selection switches, wherein the bonus selection switches also allow a recurring period of time to be selected whereby the bonus credit value assigned to the fund input of the preferred form is configured to be capable of being varied according to the recurring period of time.

2. The apparatus of claim 1 wherein the fund input of the preferred form comprises paper currency of at least a minimum denomination.

3. The apparatus of claim 1 wherein the fund input of the preferred form comprises a credit card payment.

4. The apparatus of claim 1 wherein the fund input of the preferred form comprises an electronic fund transfer.

5. The apparatus of claim 1 further comprising a display, in operative communication with the car wash controller, for communicating information about the accumulation of the credit values.

6. The apparatus of claim 5 wherein the display further communicates information, in response to the fund units being received via the control input, regarding which among at least two options for the car wash function are available under the present accumulation of the credit values, and options for additional fund units required to make a car wash function become available.

7. The apparatus of claim 5 further comprising a menu, in operative communication with the car wash controller, whereby a desired car wash function is configured to be selectable from among the at least two car wash functions.

8. The apparatus of claim 1 further comprising a validator, operatively connected to the evaluator, for confirming that the fund inputs are valid.

9. The car wash of claim 1 wherein the preferred form comprises a paper currency bill of a preselected denomination.

10. The car wash of claim 1 wherein the preferred form comprises a coin of a preselected denomination.

11. The car wash of claim 1 wherein the preferred form comprises a preselected token.

12. The car wash of claim 1 wherein the preferred form comprises a credit card payment.

13. The car wash of claim 1 wherein the preferred form comprises an electronic payment.

14. The car wash of claim 1 wherein the preferred form comprises payment with a temporary payment card.

15. The car wash of claim 1 wherein the preferred form comprises a code.

16. The car wash of claim 1 wherein the preferred form comprises a key.

* * * * *

UNITED STATES PATENT AND TRADEMARK OFFICE
CERTIFICATE OF CORRECTION

PATENT NO. : 7,637,365 B2  Page 1 of 1
APPLICATION NO. : 10/865647
DATED : December 29, 2009
INVENTOR(S) : Ringdahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Ninth Day of November, 2010

David J. Kappos
*Director of the United States Patent and Trademark Office*